United States Patent
Adam et al.

(10) Patent No.: US 10,063,844 B2
(45) Date of Patent: Aug. 28, 2018

(54) DETERMINING DISTANCES BY PROBABILISTIC TIME OF FLIGHT IMAGING

(71) Applicant: Microsoft Technology Licensing, LLC., Redmond, WA (US)

(72) Inventors: Amit Adam, Haifa (IL); Erez Tadmor, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 505 days.

(21) Appl. No.: 14/055,897

(22) Filed: Oct. 17, 2013

(65) Prior Publication Data

US 2015/0109414 A1 Apr. 23, 2015

(51) Int. Cl.
| | |
|---|---|
| *H04N 13/296* | (2018.01) |
| *G01C 11/02* | (2006.01) |
| *G01S 17/89* | (2006.01) |
| *H04N 13/02* | (2006.01) |
| *H04N 5/235* | (2006.01) |
| *G01S 17/10* | (2006.01) |
| *G01S 7/486* | (2006.01) |

(52) U.S. Cl.
CPC ......... *H04N 13/0296* (2013.01); *G01C 11/02* (2013.01); *G01S 7/4865* (2013.01); *G01S 17/107* (2013.01); *G01S 17/89* (2013.01); *H04N 5/2353* (2013.01); *H04N 13/0253* (2013.01)

(58) Field of Classification Search
None
See application file for complete search history.

(56) References Cited

U.S. PATENT DOCUMENTS

| | | | |
|---|---|---|---|
| 2011/0141306 A1* | 6/2011 | Nakano | H04N 13/025 348/222.1 |
| 2012/0033045 A1 | 2/2012 | Schweizer et al. | |
| 2012/0069176 A1 | 3/2012 | Park et al. | |
| 2012/0082346 A1 | 4/2012 | Katz et al. | |
| 2012/0123718 A1 | 5/2012 | Ko et al. | |
| 2013/0235160 A1* | 9/2013 | Cohen | G01S 7/484 348/46 |
| 2015/0161818 A1* | 6/2015 | Komenczi | G06T 17/00 348/43 |

FOREIGN PATENT DOCUMENTS

| | | |
|---|---|---|
| CN | 102099703 A | 6/2011 |
| CN | 102112844 A | 6/2011 |

(Continued)

OTHER PUBLICATIONS

Fuchs et al., "Multipath Interference Compensation in Time-of-Flight Camera Images", 2010, 2010 International Conference on Pattern Recognition.*

(Continued)

*Primary Examiner* — William C Vaughn, Jr.
*Assistant Examiner* — Joseph A Towe (57) ABSTRACT

An embodiment of the invention provides a time of flight three-dimensional TOF-3D camera that determines distance to features in a scene responsive to amounts of light from the scene registered by pixels during different exposure periods and an experimentally determined probabilistic model of how much light the pixels are expected to register during each of the different exposure periods.

18 Claims, 4 Drawing Sheets

(56) References Cited

FOREIGN PATENT DOCUMENTS

| CN | 102204259 A | 9/2011 | | |
|---|---|---|---|---|
| CN | 102520574 A | 6/2012 | | |
| DE | 10153742 A1 | 5/2003 | | |
| WO | 2008152647 A2 | 12/2008 | | |
| WO | WO 2008152647 A2 * | 12/2008 | ............. | G01B 11/24 |
| WO | WO 2009078002 A1 * | 6/2009 | ........... | G01S 17/107 |
| WO | 2012/107574 A1 | 8/2012 | | |

OTHER PUBLICATIONS

Jimenez et al. "Modelling and Correction of Multipath Interference in Time of Flight Cameras", 2012, IEEE.*

Fuchs et al., "Multipath Interference Compensation in Time-of-Flight Camera Images", 2010 International Conference on Pattern Recognition.*

Hahne et al., "Exposure Fusion for Time-of-Flight Imaging", Pacific Graphics 2011, vol. 30 (2011), No. 7.*

Zhu et al., "Fusion of Time-of-Flight Depth and Stereo for High Accuracy Depth Maps", 2008, IEEE.*

"International Search Report and Written Opinion Received for PCT Patent Application No. PCT/US2014/060210", dated Jan. 21, 2015, 10 Pages.

David Jim'Enez et al, Modeling and Correction of Multipath Interference in Time of Flight Cameras; Jun. 16, 2012; In Proceeding of International Conference on Computer Vision and Pattern Recognition; pp. 893-900 http://ieeexplore.ieee.org/stamp/stamp.jsp?tp=&arnumber=6247763.

Jiejie Zhu et al; Fusion of Time-of-Flight Depth and Stereo for High Accuracy Depth Maps; Jun. 23, 2008; In Proceeding of International Conference on Computer Vision and Pattern Recognition; pp. 1-8; http://ieeexplore.ieee.org/stamp/stamp.jsp?tp=&arnumber=4587761.

Stefan Fuchs; Multipath Interference Compensation in Time-of-Flight Camera Images—Published Date: Aug. 2010; In Proceeding of International Conference on Pattern Recognition; pp. 3583-3586: https://ieeexplore.ieee.org/stamp/stamp.jsp?tp=&arnumber=5597396.

Rog'erio Schmidt Feris; Detection and Modeling of Depth Discontinuities with Lighting and Viewpoint Variation; Sep. 2006; pp. 1-165; In Thesis Dissertation of Doctor of Philosophy, Department of Computer Science, University of California http://rogerioferis.com/publications/FerisPhD.pdf.

Uwe Hahne et al; Exposure Fusion for Time-Of-Flight Imaging; Pacific Graphics 2011; vol. 30 (2011), No. 7; pp. 1-8.

"International Preliminary Report on Patentability Issued in PCT Application No. PCT/US2014/060210", dated Oct. 12, 2015, 6 Pages.

Office Action issued in corresponding Chinese Patent Application Serial No. 201480057283.1; dated Aug. 18, 2017, 6 pages.

"First Office Action Issued in Chinese Patent Application No. 201480057283.1", dated Mar. 20, 2017, 8 Pages.

* cited by examiner

DETERMINING DISTANCES BY PROBABILISTIC TIME OF FLIGHT IMAGING

TECHNICAL FIELD

Embodiments of the invention relate to determining distances to features in a scene using a time of flight camera.

BACKGROUND

A time of flight (TOF) three dimensional (3D) camera acquires distances to features in a scene that the TOF-3D camera images by determining how long it takes temporally modulated light that the camera transmits to illuminate the scene to make a "round trip" from the camera to the features and back to the camera. The known speed of light and a round trip time to a given feature in the scene determined by the TOF-3D camera are used to determine a distance of the given feature from the TOF-3D camera. A "range image" of the scene generally refers to the distances acquired by the TOF-3D camera to substantially all features in the scene that the TOF-3D camera images at substantially a same given time.

In a "gated" TOF-3D camera, a train of light pulses may be transmitted by a light source to illuminate a scene that the camera images. Upon lapse of a predetermined, same delay interval, hereinafter an "exposure delay", after each light pulse in the train of light pulses is transmitted, the camera is shuttered, or "gated", ON, for a short exposure period, which ends when the camera is shuttered, or "gated", OFF. The camera images light from the transmitted light pulses reflected by features in the scene that reaches the camera during the exposure periods on pixels of a photosensor that the camera comprises. The light reflected by a feature in the scene from a transmitted light pulse reaches a pixel on which the feature is imaged as a reflected light pulse having pulse shape substantially the same as the pulse shape of the transmitted light pulse from which it was reflected.

An amount of reflected light from a feature imaged on a pixel that is registered by the pixel during an exposure period, is a function of a correlation between the pulse shape of the reflected light pulses and an exposure period sensitivity profile of the pixel for registering light during the exposure periods. The correlation, which may also be referred to as a correlation between the light pulse and exposure period, is a function of the round trip time for light to propagate to the feature and back to the gated TOF-3D camera and the known exposure delays. The amounts of light in the reflected light pulses registered by the pixel during the exposure periods associated with the transmitted train of light pulses, and the known exposure delay, are used to determine a round trip time of light to and back from the feature and therefrom distance to the feature.

A pixel registers incident light by accumulating positive or negative electric charge, hereinafter also referred to as "photocharge" provided by electron-hole pairs generated by photons in the incident light. Circuitry in the TOF-3D camera converts photocharge accumulated by the pixels into voltages that are used as measures of the amounts of photocharge they respectively accumulate. An amount of light that a pixel registers may refer to the amount of photocharge accumulated by a pixel responsive to incident light, or to a voltage generated responsive to the accumulated photocharge. A response of a pixel refers to an amount of light that the pixel registers responsive to incident light.

Pulse shape of a light pulse refers to a shape of a curve representing intensity of light on a surface through which the light pulse passes as a function of time, normalized to a maximum intensity of light in the light pulse. Pulse shape may also refer to the shape of a curve representing the normalized intensity as a function of position along the width of the light pulse. Intensity of light in the light pulse at a given time, or location along the light pulse width, is equal to a product of a magnitude of the pulse shape at the time or position times a maximum intensity of the light pulse. An exposure period "sensitivity profile", or exposure period "profile", refers to shape of a curve representing sensitivity of a pixel in the TOF-3D camera photosensor for registering light between ON and OFF times of the exposure period. Sensitivity of a pixel for registering light refers to an amount of photocharge that the pixel registers per unit of optical energy incident on the pixel.

Whereas an amount of light registered by a pixel during the exposure periods is a function of the correlation between the reflected light pulses and the exposure periods, the amount is also a function of intensity of the reflected light pulse and thereby of reflectivity of the feature. Reflectivity of the feature is generally not known from the registered light. Furthermore, during an exposure period a pixel registers background light from a scene and light from "multipath light", in addition to reflected light from the feature. Background light is not a function of round trip time. Multipath light refers to light in reflected light pulses that has undergone more than one reflection in reaching the TOF-3D camera rather than being reflected once, directly back to the camera from a feature imaged by the camera. Multipath light reaches the TOF-3D camera delayed relative to directly reflected light. An amount of light that the pixel registers during an exposure period is therefore affected by variables other than round trip time that vitiate distance information in the amount of registered light.

SUMMARY

An aspect of an embodiment of the invention relates to providing a TOF-3D camera that determines distance to features in a scene responsive to amounts of light from the scene registered by pixels during different exposure periods and a probabilistic model of how much light the pixels are expected to register during each of the different exposure periods. A distance to a feature in the scene may be a distance determined responsive to the probabilistic model that is most probable to have resulted in the amounts of light registered by the pixel for the different TOF exposure periods.

In an embodiment of the invention, to register the amounts of light the TOF-3D camera illuminates the scene with a plurality of transmitted light pulses, each associated with a different exposure period selected from a plurality of different exposure periods of the camera that is synchronized with a transmission time of the transmitted light pulse to register an amount of light from the scene. The TOF-3D camera, transmitted light pulses, and associated exposure periods are configured so that each pixel in the TOF-3D camera's photosensor registers and provides a measure of an amount of light that reaches the pixel from the scene for each of the different exposure periods, hereinafter also referred to as TOF exposure periods. Two TOF exposure periods are different if their respective ON and/or OFF times relative to a transmission time of their respective associated light pulses are different. Two TOF-3D exposure periods are different if their profiles between their respective ON and OFF times are different.

An aspect of an embodiment of the invention relates to providing a probabilistic model based on experimentally determined sensitivity of a pixel in the TOF-3D camera to registering light reflected from a feature in a scene for each of the different TOF exposure periods as a function of distance of the feature from the camera.

In an embodiment of the invention, the model assumes a function $\Lambda(t)$ that describes intensity of light reaching a pixel from a feature in the scene imaged on the pixel as a function of time t. Time t may be measured relative to a time at which a given light pulse of the plurality of transmitted light pulses is transmitted by the camera to illuminate the scene. In an embodiment $\Lambda(t)$ is defined by an expression:

$$\Lambda(t) \propto \rho + \rho IP(t) + \rho \beta(\delta t) IP(t+\delta t).$$

In the expression for $\Lambda(t)$, $\alpha$ is a measure of intensity of ambient background light incident on the imaged feature, and $\rho$ is reflectivity of a surface of the imaged feature that reflects light to the TOF-3D camera. I is a maximum intensity of the transmitted light pulse and P(t) is the pulse shape of the transmitted light pulse as a function of time t. The factor $\beta(\delta t)$ is a scaling factor that describes intensity of light relative to $\rho I$ in a delayed reflected light pulse that is delayed by a time $\delta t$ relative to time t in reaching the TOF-3D camera. The delay $\delta t$ is caused because light in the delayed, reflected light pulse undergoes at least one reflection in addition to reflection by the imaged feature and reaches the TOF-3D camera by a longer path than light in a reflected light pulse that travels from the camera directly to the imaged feature and directly back to the camera. A reflected light pulse that reaches the TOF-3D camera after being reflected more than once is referred to as a "multipath reflected pulse".

In general, the contribution to $\Lambda(t)$ from multipath reflected light involves performing an integration over the delay $\delta t$ assuming a model that models how multipath reflected light reaches a pixel in the TOF-3D camera. The integration accounts for light reaching the pixel from multipath reflected light pulses originating at the feature imaged on the pixel that undergo more than one additional reflection, and for multipath reflected light pulses $\beta(\delta t)$ reaching the pixel that originate at features other than the imaged feature.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1A:
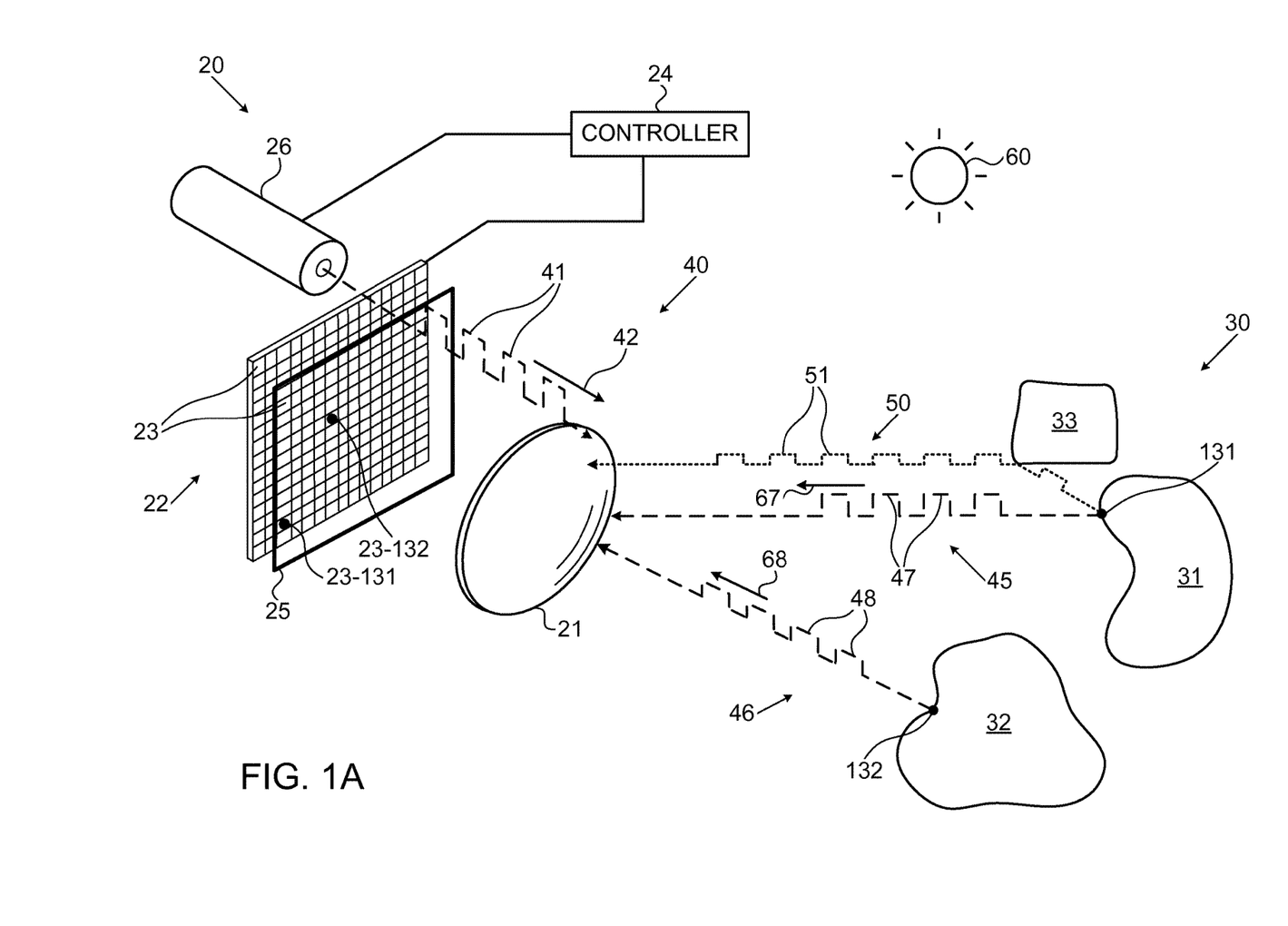
FIG. 1A schematically shows a TOF-3D camera transmitting a train of light pulses to illuminate a scene and determine distances to features in the scene in the presence of background light and multipath reflected light pulses.

In the following text of the detailed description, features of a TOF-3D camera are shown in FIG. 1A and discussed with reference to the figures. Operation of the TOF-3D camera shown in FIG. 1A is discussed with reference to a timeline graph shown in FIG. 1B. The timeline graph illustrates timing of transmission times of transmitted light pulses used to illuminate a scene imaged by the TOF-3D camera shown in FIG. 1A and timing relationships between light reflected from the transmitted light pulses by features in the scene and TOF exposure periods of the camera. FIG. 1C shows a timeline graph of a train of light pulses and a plurality of different TOF exposure periods of the TOF-3D camera having different ON times. The TOF exposure periods may be used in shuttering the camera to register amounts of light reflected from the light pulses by features in the scene that are usable to determine distances to the features in accordance with an embodiment of the invention. FIG. 2 schematically shows the TOF-3D camera being calibrated to determine a probabilistic model of how much light pixels in the TOF-3D camera are expected to register during each of a plurality of different TOF exposure periods to image a scene and determine distances to features in the scene, in accordance with an embodiment of the invention.

FIG. 1A schematically shows a gated TOF-3D camera 20 being used to determine distances to features in a scene 30 having objects 31, 32, and 33. An icon 60 schematically indicates that objects 31, 32, and 33 in the scene are exposed to ambient background light. The icon and its reference numeral represent, and are used to reference, ambient background light.

TOF-3D camera 20, which is represented very schematically, comprises an optical system, represented by a lens 21, and a photosensor 22 having pixels 23 on which the lens system images scene 30. TOF-3D camera 20 optionally comprises a shutter 25 for shuttering the camera ON and OFF, a light source 26, and a controller 24 that controls shutter 25 and light source 26. Whereas TOF-3D camera 20 is schematically shown having a shutter 25 separate from photosensor 22, a TOF-3D camera may comprise a photosensor that includes circuitry operable to shutter ON and shutter OFF the photosensor and thereby the camera. A reference to shuttering ON or shuttering OFF a TOF-3D camera is understood to include shuttering the camera ON and OFF using any methods or devices known in the art, irrespective of whether or not specific reference is made to a "separate" shutter.

To determine distances to features in scene 30, controller 24 controls light source 26 to transmit a train 40 of transmitted light pulses 41, to illuminate scene 30. Transmitted light pulses 41 are schematically represented by rectangular pulses associated with an overhead arrow 42 indicating direction of propagation of the light pulses. In practice, light pulses 41 are generally not rectangular, may have irregular pulse shapes, and often have rising and falling edges that resemble curves that describe a capacitor charging and discharging respectively. Light pulses 41 may have pulse widths between about 5 and 20 ns (nanoseconds). Features in scene 30 reflect light from each transmitted light pulses 41 back towards TOF-3D camera 20 as a reflected light pulse.

In FIG. 1A objects 31 and 32 have features 131 and 132 respectively that are schematically shown reflecting light from transmitted light pulses 41 as trains 45 and 46 of reflected light pulses 47 and 48 respectively. Overhead arrows 67 and 68 schematically indicate direction of propagation of light pulses 47 and 48, respectively. Reflected light pulses, such as reflected light pulses 47 and 48, generally have reduced intensity compared to transmitted light pulses 41 from which they were reflected but substantially a same pulse shape as the transmitted light pulses. Feature 131 is also schematically shown reflecting a train 50 of light pulses 51 that do not propagate directly to TOF-3D camera 20 but undergo reflection from body 33 before continuing on to TOF-3D camera 20. Reflected light pulses 51 are multipath reflected light pulses. Because of their additional reflection, multipath reflected light pulses 51 are attenuated more than light pulses 47 or 48 and have intensity substantially reduced relative to light intensities that characterize reflected light pulses 47 and 48.

At a given predetermined ON time relative to a time at which each transmitted light pulse 41 is transmitted, controller 24 opens shutter 25 to shutter ON TOF-3D camera 20 for a TOF-3D exposure period. Assume by way of example that the ON time follows the transmission time by a predetermined time lapse, which may be an exposure delay "$T_L$". During each TOF-3D exposure period TOF-3D camera 20 images light received from scene 30 on pixels 23 in photosensor 22. Light in a reflected light pulse from a given feature in scene 30 that reaches TOF-3D camera 20 during the exposure period following a transmitted light pulse 41 from which it was reflected, is registered by a pixel 23 on which the camera images the given feature. An amount of light from a reflected light pulse that is registered during the exposure period is substantially proportional to a correlation between the reflected light pulse and the exposure period. A sum of the reflected light registered by the pixel during each of the TOF exposure periods may be used to provide a measure of the round trip transit time of light from TOF-3D camera 20 to the feature and back to the camera. The sum of the registered light may be used to determine a distance to the feature imaged on the pixel.

However, in addition to registering an amount of light reflected from transmitted light pulses 41 by the imaged feature, the pixel also images background light 60 during the TOF exposure periods and multipath reflected light from the imaged feature and other features in scene 30 that reaches TOF-3D camera 20 during each TOF exposure period.

By way of illustrated example, light in reflected light pulses 47 from feature 131 is imaged on, and registered by a pixel 23 designated 23-131 in FIG. 1A, and light in reflected light pulses 48 from feature 132 is imaged on, and registered by a pixel 23 designated 23-132 in the figure. The amounts of light registered by pixels 23-131 and 23-132 responsive to reflected light pulses 47 and 48 are substantially proportional to the correlations of exposure periods of TOF-3D camera 20 with reflected light pulses 47 and 48. The correlations are a function of the round trip transit times of light from light source 26 to features 131 and 132 and back from the features to TOF-3D camera 20. The amounts of light registered by pixels 23-131 and 23-132 during the TOF exposure periods provide measures of the correlations and are used, optionally by controller 24, to determine distances from TOF-3D camera 20 to features 131 and 132 respectively.

However, as noted above, pixels 23 in photosensor 22 register background light 60 during the TOF exposure periods of TOF-3D camera 20. And as schematically shown for pixel 23-131, which in FIG. 1A receives light from multipath reflected light pulses 51 as well as from reflected light pulses 47, pixels 23 in photosensor 22 may also register light from multipath reflected light pulses 51.

Figure 1B:
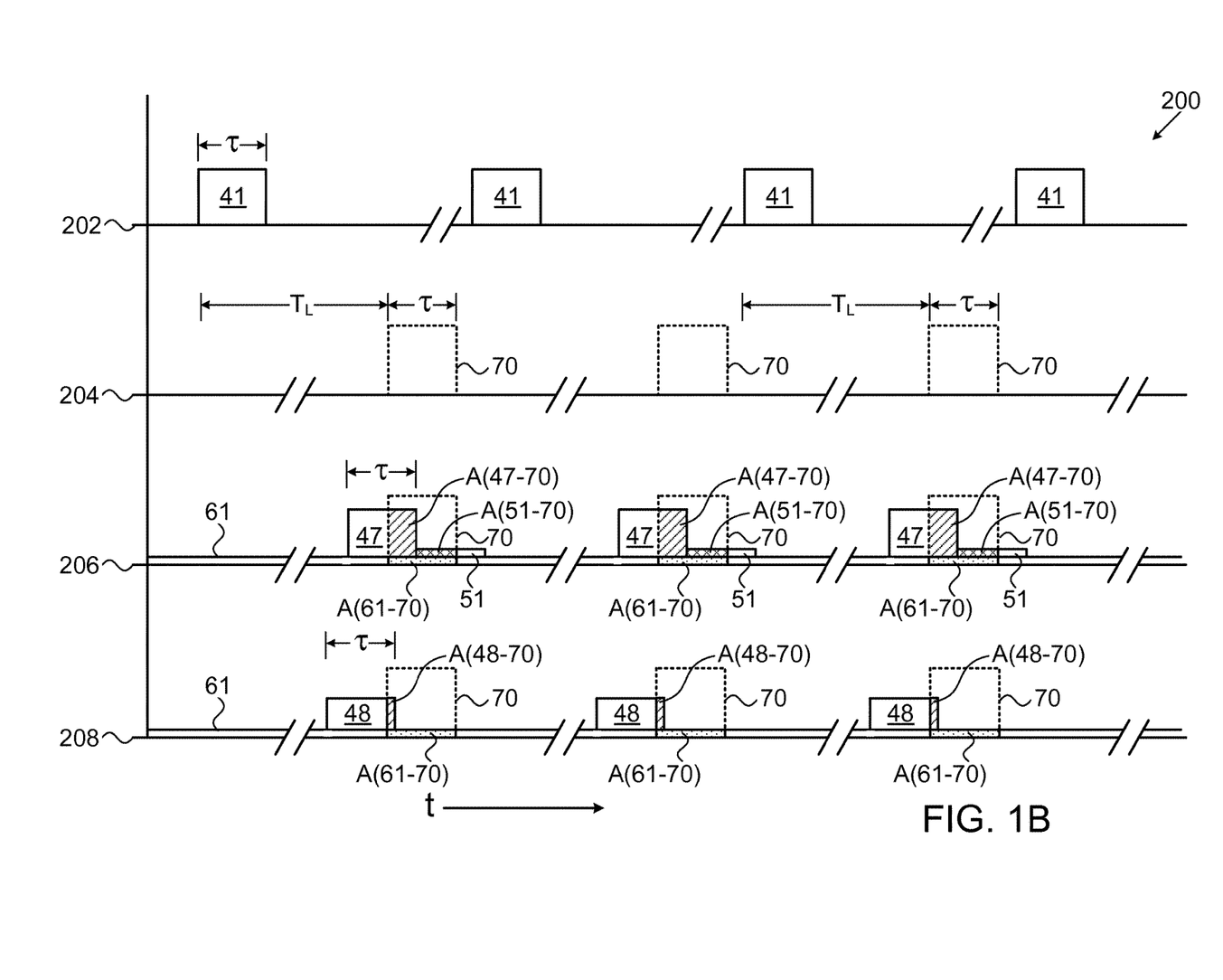
FIG. 1B shows a timeline graph that illustrates relative timing of light pulses in the train of light pulses transmitted by the TOF-3D camera shown in FIG. 1A, TOF-3D exposure periods associated with the transmitted light pulses and contributions to amounts of light accumulated by pixels in the camera's photosensor from light pulses reflected by features in the scene, background light, and multipath reflections.
Figure 1C:
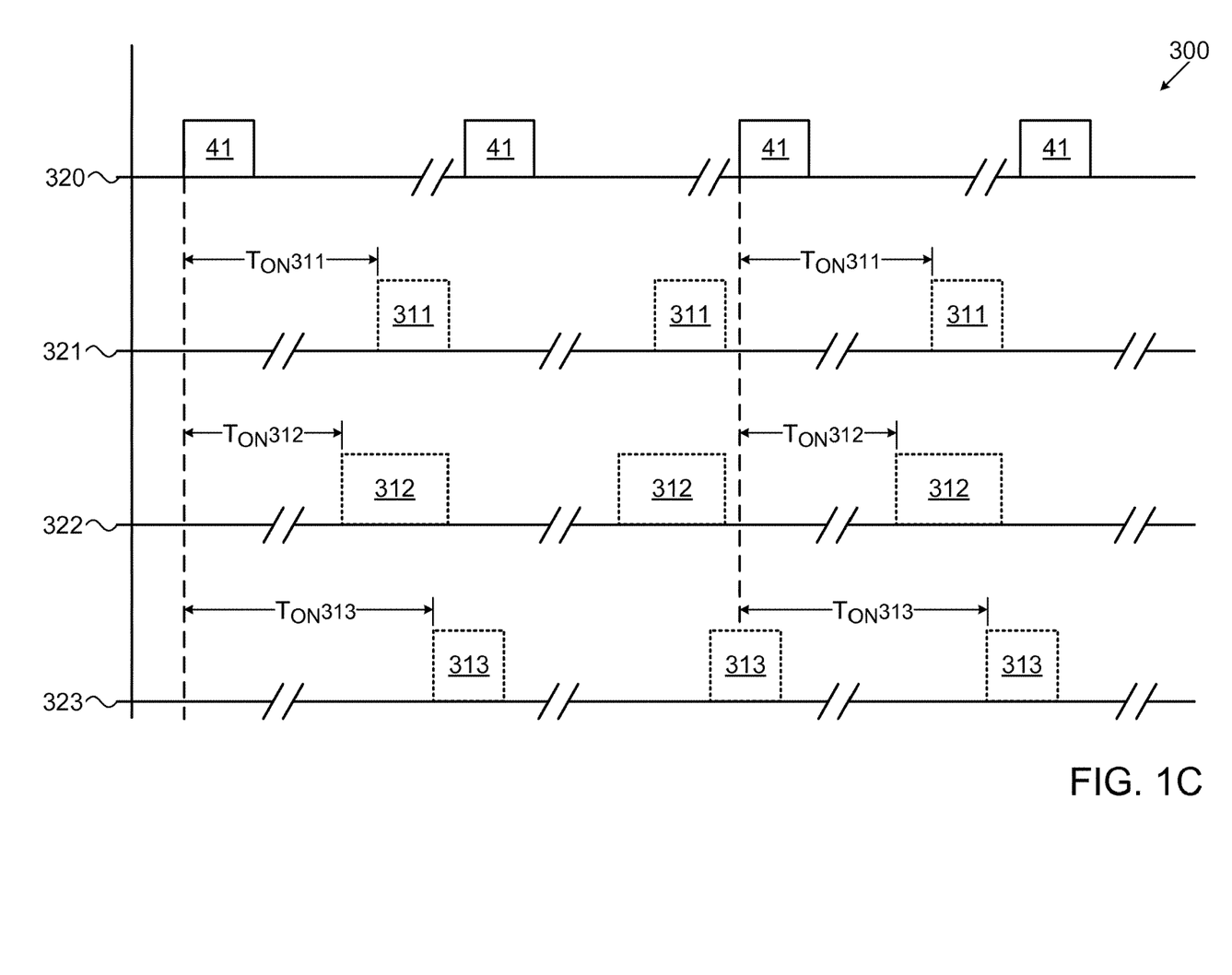
FIG. 1C shows a timeline graph of a train of light pulses and different exposure periods that may be used with the light pulse train to determine distances to features in a scene in accordance with an embodiment of the invention.
Figure 2:
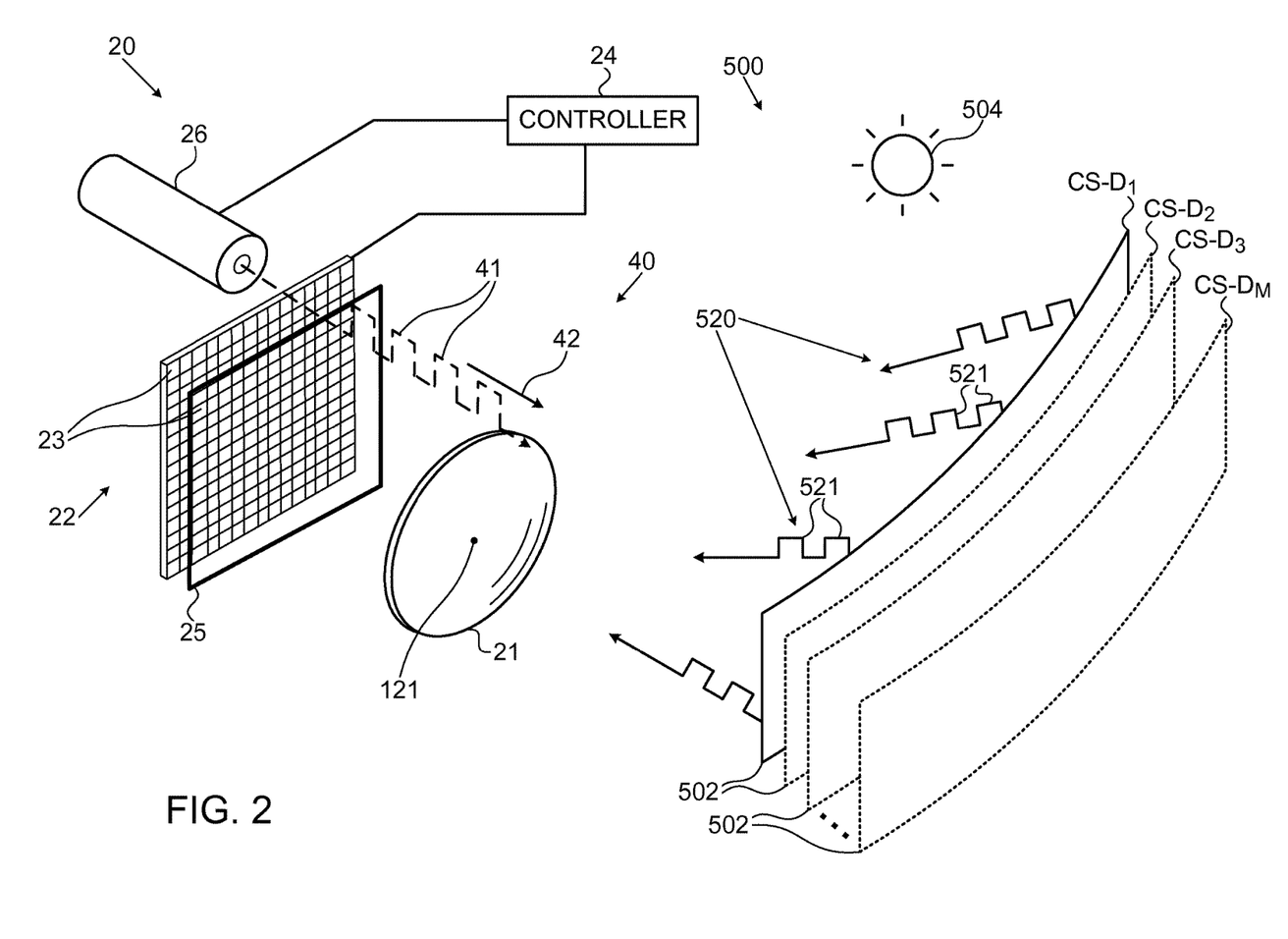
FIG. 2 schematically shows the TOF-3D camera shown in FIG. 1A undergoing calibration in a controlled environment according to an embodiment of the invention.

FIG. 1B shows a timeline graph 200 that schematically illustrates relative timing of transmitted light pulses 41 in train 40, TOF exposure periods of TOF-3D camera 20, reflected light pulses 47 and 48 and multipath reflected light pulses 51. The graph schematically illustrates correlations between TOF exposure periods of TOF-3D camera 20 and reflected light pulses 47, 48 and multipath reflected light pulses 51. Timeline graph 200 comprises timelines 202, 204, 206, and 208.

Transmitted light pulses 41 are schematically represented by rectangles along timeline 202 and are indicated as having a light pulse width τ. TOF exposure periods are schematically represented by dashed rectangles 70 along timeline 204 and have duration SW, optionally, as shown in FIG. 1B equal to τ. A TOF exposure period 70 is associated with each transmitted light pulse 41, and is indicated as having an ON time following an exposure delay $T_L$ after a transmission time of transmitted light pulse 41 with which TOF exposure period 70 is associated.

Reflected light pulses 47 and multipath reflected light pulses 51 reflected by feature 131 from transmitted light pulses 41 are shown along timeline 206. Reflected light pulses 48 reflected by feature 132 from transmitted light pulses 41 are shown along timeline 208. Intensity of background light reaching TOF-3D camera 20 is schematically represented by a height of a line 61 above time lines 206 and 208. Height of transmitted light pulses 41 above time line 202 and height of reflected light pulses 47, 48, and multipath reflected light pulses 51 above background light 61 in FIG. 1B schematically represent intensity of light in the light pulses. Height of reflected light pulses 47 is smaller than that of transmitted light pulses 41 to schematically indicate that intensity of the reflected light pulses is less than that of the transmitted light pulses. Height of light pulses 48 is less than that of light pulses 47 to indicate that reflectivity of feature 132 (FIG. 1A) is substantially less than that of feature 131. Height of multipath reflected light pulses 51 is less than that of either reflected light pulses 47 and 48 because multipath reflected light pulses 51 are reflected twice before reaching TOF-3D camera 20.

It is noted that in FIG. 1A pixel 23-131 is indicated as receiving light from multipath light pulses 51 that originate at feature 131, are reflected from object 33 before reaching pixel 23-131 and travel a same path to pixel 23-131. However, pixel 23-131 may receive light from multipath reflected light pulses that do not necessarily originate at feature 131 or that do not necessarily travel the same path to TOF-3D camera 20 that multipath reflected light pulses 51 travel. And whereas light pulses 51 are indicated as having intensities less than light pulses 47 that are directly reflected from feature 131 to pixel 23-131, a total amount of light incident on pixel 23-131, from multipath reflected light pulses that travel over different paths to reach pixel 23-131 may be greater than an amount of light received from light pulses 47 that are directly reflected to the pixel from feature 131.

TOF exposure periods 70 shown along timeline 204 are reproduced along timelines 206 and 208 to show relative timing between TOF exposure periods 70 and reflected light pulses 47, 48 and multipath reflected light pulses 51. As shown along time lines 206 and 208, reflected light pulses 48 reach TOF-3D camera 20 relative to their respective associated TOF exposure periods 70 earlier than reflected light pulses 47 because feature 132 is closer to the TOF-3D camera than feature 131 (FIG. 1A). Light in reflected light pulse 48 has a shorter round trip time than light in reflected light pulse 47. Multipath reflected light pulses 51, shown along time line 206, reach TOF-3D camera 20 later than reflected light pulses 47 because, as schematically indicated in FIG. 1A, the reflected multipath light pulses travel a longer distance to TOF-3D camera 20 than "directly reflected" light pulses 47.

A shaded area A(47-70) of a reflected light pulse 47 from feature 131 in a region of the light pulse that temporally overlaps a TOF exposure period 70, schematically represents a magnitude of a correlation between reflected light pulse 47 and the TOF exposure period. An amount of light, in reflected light pulse 47 that is registered by pixel 23-131, which images feature 131, is proportional to the correlation and is also represented by shaded area A(47-70) in FIG. 1B. A shaded temporal overlap area A(51-70) of a multipath reflected light pulse 51 and a TOF exposure period 70 represents magnitude of correlation between the multipath reflected light pulse and the TOF exposure period and an amount of light from the multipath reflected light pulse that is registered by pixel 23-131 during the TOF exposure period. An amount of background light 60 (FIG. 1A) registered by pixel 23-131 during each TOF exposure period 70 is substantially equal to an integral of the background light from an ON time to an OFF time of the TOF exposure period and is represented by a shaded area A(61-70).

Similarly, a magnitude of the correlation between a reflected light pulse 48 from feature 132 and a TOF exposure period 70 is indicated by a shaded temporal overlap area A(48-70) of reflected light pulse 48 and TOF exposure period 70, and represents an amount of light from the reflected light pulse that is registered by pixel 23-132. And, as in the case of pixel 23-131, pixel 23-132 registers an amount of background light 60, represented by a shaded area A(61-70), during each TOF exposure period 70, shown along time line 208.

From the above discussion and examples it is seen that an amount of light registered by a pixel 23 in photosensor 22 during TOF exposure periods 70 is generally a complex function of amounts of light that reach the pixel from different sources in scene 30 and temporal relationships between the light from the different sources and TOF exposure periods 70. Whereas during TOF exposure periods 70 pixels 23 in photosensor 22 register amounts of light from reflected light pulses that contain distance information with respect to features in scene 30 that are imaged on the pixels, the pixels also register amounts of background light that do not contain distance information and amounts of multipath reflected light that contain distance "mis-information". Furthermore, the amounts of light from reflected light pulses that are registered are functions of reflectivity of the imaged features, which are generally not known or accurately known from amounts of light registered by pixels 23 during TOF exposure periods 70.

To provide distances to features in a scene imaged by TOF-3D camera 20, in accordance with an embodiment of the invention, controller 24 controls TOF-3D camera 20 to register light reflected by the features from light pulses transmitted by light source 26 for each of a plurality of "N" different TOF exposure periods. N may be any number greater than or equal to two. Optionally N is greater than or equal to three. In accordance with an embodiment of the invention the amounts of light registered by a given pixel 23 in photosensor 22 for each of the different TOF exposure periods are used to mediate the complexity of the sources of the registered light and determine a distance to a feature imaged on the pixel.

As noted above, two TOF exposure periods are different if their respective ON and/or OFF times relative to a transmission time of their respective associated transmitted light pulses are different. Two TOF-3D exposure periods are different if their profiles between their respective ON and OFF times are different. FIG. 1C shows a time line graph 300 showing a train 40 (FIG. 1A) of light pulses 41 that may be used to illuminate a scene and three different TOF exposure periods 311, 312 and 313 of N TOF exposure periods that may be used with a light pulse train identical to train 40 to register light from the scene and determine distances to features in the scene in accordance with an embodiment of the invention. Light pulses 41 are schematically shown along a time line 320 and exposure periods 311, 312 and 313 are schematically shown along time lines 321, 322 and 323, respectively. By way of example, exposure periods 311, 312 and 313 have same sensitivity profiles but are different because their respective ON times, $T_{on}$311, $T_{on}$312, $T_{on}$313 relative to transmission times of light pulses 41 are different. The ON times are indicated by witness arrows labeled $T_{on}$311, $T_{on}$312, and $T_{on}$313 between transmission times of light pulses 311, 312 and 313 and ON times of TOF exposure periods 311, 312 and 313 respectively. Exposure periods in accordance with an embodiment of the invention may of course have different durations and exposure periods 312 are schematically shown in FIG. 1C having longer durations than exposure periods 311 and 313.

It is noted that In FIGS. 1A-1C transmitted light pulses 41 and reflected light pulses 47 and 48 are shown for convenience of presentation as ideal square pulses with substantially zero rise times, zero fall times, and perfectly uniform intensities. TOF exposure periods 70 and 311, 312 and 313 are also shown as ideal and having a perfectly rectangular shape, with sensitivity of pixels 23 in TOF 3D camera 20 rising with zero rise time at an ON time of a TOF exposure period to maintain a constant sensitivity for a duration of the TOF exposure period until an OFF time of the TOF exposure period. At the OFF time, sensitivity of pixels 23 for registering light is shown falling to zero abruptly, with zero fall time.

However, practical light pulses and TOF exposure periods have non-zero rise and fall times, and generally are not characterized by rectangular pulse shapes and sensitivity profiles that provide ideally uniform intensities and sensitivities. Furthermore, for a same transmitted light pulse and identical ambient light conditions, first and second pixels imaging first and second identical features respectively may be exposed to different amounts of incident light. The different amounts of incident light may for example result from peculiarities in configuration and manufacturing tolerances of structure of TOF-3D camera 20, lens 21, and/or light source 26. In addition, two different pixels 23 may register different amounts of light for same amounts of incident light as a result of differences of efficiency with which the pixels convert incident light into photocharge. As a result, in practice, correlations between reflected light pulses and TOF exposure periods are generally substantially more complex than might be implied by the simple rectangular features of FIGS. 1A, 1B, and 1C.

Let a transmitted light pulse transmitted at time $t_o=0$ by TOF-3D camera 20 to illuminate a scene, such as scene 30 in FIG. 1A, imaged by TOF-3D camera 20 have a pulse shape P(t) defined having non-zero intensity for 0<t<PW, where PW is the pulse width of the transmitted light pulse. It is noted that P(t) was defined above as a "normalized" function having a maximum value equal to 1 so that intensity of light in the transmitted light pulses may be written IP(t), where I is a maximum intensity of the light pulses.

Let a TOF exposure period of TOF-3D camera 20 have duration SW, and sensitivity profile defined by a function of time S(t) having non-zero value for 0<t<SW. Assume that TOF-3D camera 20 is shuttered on at a time $T_{on}$ relative to time $t_o=0$, as a result of which the TOF exposure period sensitivity profile S(t) as a function of time may be represented by $S(t,T_{on})=S(t-T_{on})$. S(t) may be used to represent and refer to an exposure period having sensitivity profile S(t) and $S(T_{on})$ may be used to represent and refer to the TOF exposure period having a sensitivity profile S(t) and ON time $T_{on}$. Let a given "j-th" pixel 23 in photosensor 22 be represented by $p_j$, 0<j≤J, where J may be equal to a total number of pixels 23 in photosensor 22.

If light from the transmitted light pulse is reflected by a feature at a distance D from TOF-3D camera 20, a round trip time $T_{RT}$ for the reflected light is equal to about 2D/c, where c is the speed of light. Let intensity as a function of time t of light incident on a given pixel $p_j$ in photosensor 22 that images the feature be represented by a function Λ(j,t). Λ(j,t) may be defined by an expression:

$$\Lambda(j,t)=px_j[\alpha\rho+\rho IP(t-T_{RT})+p\beta(\delta)IP(t-T_{RT}-\delta t)]. \quad (1)$$

In the expression for Λ(j,t), α is a measure of intensity of ambient background light incident on the imaged feature, and ρ is reflectivity of the imaged feature. The factor β(δt) is a scaling factor that describes intensity of light relative to ρI in a delayed reflected light pulse delayed by a time δt relative to round trip time $T_{RT}$ in reaching the TOF-3D camera. The delay δt is generated because light in the delayed, reflected light pulse undergoes at least one reflection in addition to reflection by the imaged feature. As a result, light in the multipath reflected light pulse reaches the camera by a longer path than light in a reflected light pulse that travels from the TOF-3D camera directly to the imaged feature and directly back to the TOF-3D camera. The function $px_j$ accounts for possible differences in intensity of light reaching pixel $p_j$ compared to other pixels for same ambient light conditions, transmitted light pulses, and reflectivity and distances of features imaged on the pixels. The function $px_j$ may be a constant.

A correlation, of Λ(j,t) and S(t) is a function of the round trip time $T_{RT}$ and provides a measure of an amount of light that reaches pixel $p_j$, which may be registered by the pixel during the TOF exposure period exposure period S(t). Let the amount of light registered by pixel $p_j$ during an TOF exposure period $S(t,T_{on})$ be represented by a "response" $R(T_{RT})$ of the pixel. $R(T_{RT})$ is proportional to the correlation $\Lambda(j,t)*S(t,T_{on})$ between Λ(j,t) and S(t) and may be written:

$$R(j,T_{RT})=\gamma_j\Lambda(j,t)*S(t,T_{on})=\gamma_j\int_{-\infty}^{\infty}S(t-T_{on})\Lambda(j,t)\,dt=\gamma_j\int_{T_{on}}^{T_{on}+SW}S(t-T_{on})\Lambda(j,t)\,dt=\gamma_j\int_{T_{on}}^{T_{on}+SW}S(t-T_{on})px_j[\alpha\rho+\rho IP(t-T_{RT})+\rho\beta(\delta t)IP(t-T_{RT}-\delta t)]\,dt. \quad (2)$$

In expression (2) $\gamma_j$ is a proportionality constant equal to an expected amount of photocharge generated and accumulated by pixel $p_j$ per unit of optical energy incident on the pixel. Letting $u=(t-T_{on})$, and using the relationship $T_{RT}=2D/c$ to explicitly exhibit dependence of R on distance D, equation (2) becomes:

$$R(j,D)=px'_j\int_0^{SW}S(u)\left[\alpha\rho+\rho IP\left(u-\left(\frac{2D}{c}-T_{on}\right)\right)+\rho\beta(\delta t)IP\left(u-\left(\frac{2D}{c}-T_{on}\right)-\delta t\right)\right]du. \quad (3)$$

where in equation (3) and equations that follow $px_j'=\gamma_j\,px_j$.

It is noted that $(2D/c-T_{on})$ is just a time difference between the time at which TOF-3D camera 20 is shuttered ON and a time of arrival at the TOF-3D camera of light in a reflected light pulse from the feature imaged on pixel $p_j$. Let $\Delta t=(2D/c-T_{on})$, and writing R(j,D) to explicitly exhibit dependence of R(j,D) on variables additional to index j and distance D, equation (3) may be expressed as:

$$R(j,\alpha,\rho,I,S(T_{on}),\beta,D)=px'_j\int_0^{SW}S(u)[\alpha\rho+\rho IP(u-\Delta t)+\rho\beta(\delta t)IP(u-\Delta t-\delta t)]du \quad (4)$$

Equation 4 shows a plurality of independent variables, in addition to D, on which an amount of registered light may depend. The equation indicates how complex a response of a given pixel $p_j$ in TOF-3D camera 20 may be to light from a scene, such as scene 30, imaged by TOF-3D camera 20.

In an embodiment of the invention, TOF-3D camera 20 is calibrated to determine for each pixel $p_j$ comprised in its photosensor 22 a pixel response function, "ER" that is used to determine distances to features imaged on the pixel responsive to light registered by the pixel. ER provides an expected amount of light registered by pixel $p_j$, as a function of α, ρ, and I for each of a plurality of the N different TOF exposure periods $S(T_{on})$ that TOF-3D camera 20 uses to image a scene, and a range of distances from TOF-3D camera 20 of a feature imaged on the pixel.

Optionally, ER provides an expected amount of registered light assuming an absence of multipath reflected light pulses. However, as discussed below, for such instances, the expected amounts of registered light provided by ER may be used to decide whether accuracy of a distance determined responsive to ER is degraded by multipath reflected light to an extent that warrants discarding the determined distance. ER may also provide a variance for the expected amount of light registered by the pixel.

Let the N different TOF exposure periods be represented and distinguished by a subscripted function $S_n$, 0<n≤N. As mentioned above, two TOF exposure periods are different if they have different ON times $T_{on}$, different pulse widths SW, and/or different profiles. TOF exposure periods distinguished by different subscripts are different. Let a distance in the range of distances for which ER is defined be represented by d.

ER is optionally based on a reference function RF that provides an experimentally determined response of each pixel $p_j$ for known values, $\alpha_o$, $\rho_o$, and $I_o$, of parameters $\alpha$, $\rho$, and I without consideration of multipath reflections. The experimentally determined response also provides a value $\kappa_j$ for the proportionality constant $px'_j$. The reference function may be defined by an expression:

$$RF(j,n,d,\alpha_o,\rho_o,I_o) = \kappa_j \int_0^{SW_n} S_n(u)[\alpha_o \rho_o + \rho_o I_o P(u-\Delta t(n,d))]du, \quad (5)$$

where the dependence of $\Delta t = (2d/c - T_{on})$, on distance d, and dependence on index n through dependence of $T_{on}$ on index n, are indicated explicitly.

After integrating the first term in brackets and rearranging terms, expression (5) becomes:

$$RF(j,n,d,\alpha_o,\rho_o,I_o) = \kappa_j \alpha_o \rho_o A_n + \kappa_j \rho_o I_o \int_0^{SW_n} S_n(u) P(u-\Delta t(n,d))du. \quad (6)$$

In expression (6) $A_n$ is an area under a curve defining the profile of TOF exposure period $S_n$ as a function of time. The function RF may be determined experimentally for each pixel $p_j$ by acquiring measurements of how much light the pixel registers for the known values $\alpha_o$, $\rho_o$, and $I_o$ and transmitted light pulses having pulse shape P(t), for each TOF exposure period $S_n$ and for a plurality of distances d. An exemplary method of determining $ER(j,n,d,\alpha,\rho,I)$ is discussed below with reference to FIG. 2.

Given $RF(j,n,d,\alpha_o, \rho_o, I_o)$ the pixel response function ER may be expressed as:

$$ER(j,n,d,\alpha,\rho,I) = [\alpha\rho/\alpha_o\rho_o]\kappa_j\alpha_o\rho_o A_n + [\rho/\rho_o][I/I_o] \kappa_j \rho_o I_o \int_0^{SW_n} S_n(u) P(u-\Delta t(n,d))du. \quad (7)$$

If it is remembered that values for ER are determined for known values of $\alpha_o$, $\rho_o$, $I_o$, that ER is a function of ratios $[\alpha\rho/\alpha_o\rho_o]$ and $[\rho/\rho_o]$, and that $[I/I_o]$ is almost invariably a known parameter determined by configuration of light source 26 and operation of controller 24 generality is not lost by setting $\alpha_o = \rho_o = I_o = 1$, and writing expression (7):

$$ER(j,n,d,\alpha,\rho) = \alpha\rho\kappa_j A_n + \rho\kappa_j \int_0^{SW_n} S_n(u) P(u-\Delta t(n,d))du. \quad (8)$$

Equation (8) provides an expected value for the amount of light registered by pixel $p_j$ as a function of generally unknown values for $\alpha$, $\rho$, and d, a known value for $\kappa_j$, and known intensity and pulse shape of transmitted light pulses 41 (FIGS. 1A and 1B) for each TOF exposure period $S_n$. It is convenient to represent the expected values $ER(j,n,d,\alpha,\rho)$ for the TOF exposure periods $S_n$ and a given pixel $p_j$ by a vector $\vec{ER}(j,d,\alpha,\rho)$ having components $ER_n = ER(j,n,d,\alpha,\rho)$, $0 < n \leq N$.

Let the actual response of pixel $p_j$ to reflected light pulses from a feature in a scene imaged on pixel $p_j$ by TOF-3D camera 20 for a TOF exposure period $S_n$ be represented by "$R_n$". Let the TOF exposure periods $S_n$ be represented by an N dimensional vector $\vec{S}$ whose components are the $S_n$, and the responses $R_n$ be represented by the N dimensional vector $\vec{R}$ whose components are $R_n$, $0 < n \leq N$. Let a probability density function for pixel $p_j$ providing a response $\vec{R}$ for a given expected response $\vec{ER}(j,d,\alpha,\rho)$ be represented by:

$$\mathscr{P}(\vec{R}|\vec{ER}(j,d,\alpha,\rho)) = \mathscr{P}(\vec{R}|(j,d,\alpha,\rho)) \quad (9)$$

In an embodiment of the invention, a distance from TOF-3D camera 20 at which the feature imaged on pixel $p_j$ is located is determined by determining a set of values $\alpha_j^*$, $\rho_j^*$, and $d_j^*$ for $\alpha$, $\rho$, and d respectively that maximizes $\mathscr{P}(\vec{R}|(j,d,\alpha,\rho))$ and determining that the feature is located at distance $d_j^*$ from TOF-3D camera 20.

By way of example, in an embodiment of the invention, N is optionally equal to 3 and $\mathscr{P}(\vec{R}|(j,d,\alpha,\rho))$ is a multivariate Gaussian density function. Assuming that a covariance matrix for $\vec{ER}(j,d,\alpha,\rho)$ is diagonal, $\mathscr{P}(\vec{R}|(j,d,\alpha,\rho))$ becomes:

$$\mathscr{P}(\vec{R}|(j,d,\alpha,\rho)) = \left(\frac{1}{2\pi^{3/2}\sigma_1\sigma_2\sigma_3}\right)\exp-\left[\frac{(R_1-ER_1)^2}{\sigma_1^2} + \frac{(R_2-ER_2)^2}{\sigma_2^2} + \frac{(R_3-ER_3)^2}{\sigma_3^2}\right], \quad (10)$$

where the variances $\sigma_1^2$, $\sigma_2^2$, and $\sigma_3^2$ may be determined to be a function of shot noise and set equal to $R_1$, $R_2$, and $R_3$ respectively. Values $\alpha^*$, $\rho^*$, and $d^*$ that maximize $\mathscr{P}(\vec{R}|(j,d,\alpha,\rho))$ may be determined using any suitable procedure known in the art. For example $\alpha^*$, $\rho^*$, and $d^*$ may be determined using a least squares method or a continuous optimization technique for example, gradient descent.

In an embodiment of the invention a confidence parameter and corresponding confidence interval are defined for use in providing a measure of confidence in the set of values $\alpha^*$, $\rho^*$, and $d^*$. If the confidence parameter evaluated for the set of values $\alpha^*$, $\rho^*$, and $d^*$ is not contained in the confidence interval, it may be concluded that accuracy of $\alpha^*$, $\rho^*$, and/or $d^*$ is degraded, possibly by multipath reflected light, to such an extent that, optionally $d_j^*$, should be discarded.

For example, in an embodiment of the invention, a confidence parameter "CP" evaluated for $\alpha^*$, $\rho^*$, and $d^*$ may be defined by $$CP(d^*,\rho^*,\alpha^*) = \left[\frac{(R_1-ER_1(d^*,\rho^*,\alpha^*))^2}{\sigma_1^2} + \frac{(R_2-ER_2(d^*,\rho^*,\alpha^*))^2}{\sigma_2^2} + \frac{(R_3-ER_3(d^*,\rho^*,\alpha^*))^2}{\sigma_3^2}\right] \quad (11)$$

and the confidence interval may be set at 95%. If $CP(d^*,\rho^*,\alpha^*)$ has a probability of occurring that is less than 95% then $d_j^*$ may be determined to be unreliable and be discarded.

In an embodiment of the invention, a Bayesian inference is used to determine $d_j^*$ for a given $\mathscr{P}(\vec{R}|(j,d,\alpha,\rho))$. Optionally, a probability density function, $\mathscr{P}(d_j|j,\vec{R})$, that a distance $d_j$ is a distance to a feature imaged by TOF-3D camera 20 on pixel $p_j$ is determined by integrating $\mathscr{P}(\vec{R}|(j,d,\alpha,\rho))$ with respect to $\alpha$ and $\rho$. The integration may be performed under an assumption that $\alpha$ and $\rho$ are uniform priors. The posterior distance $d_j^*$ may then be determined in accordance with an embodiment of the invention to be a value for $d_j$ that maximizes $\mathscr{P}(d_j|j,\vec{R})$, in symbols:

$$d_j^* = \text{argmax } \mathscr{P}(d_j|j,\vec{R}). \quad (11)$$

In an embodiment of the invention, a reflectivity $\rho_j^*$ for the feature imaged on pixel 23 and intensity, $\alpha_j^*$, of ambient light is determined from a probability function $$\rho_j^*,\alpha_j^* = \text{argmax } \mathscr{P}(\rho_j,\alpha_j|,d_j^*,\vec{R}), \quad (12)$$

where $\mathscr{P}(\rho_j,\alpha_j|j,d_j^*,\vec{R})$, is determined from $\mathscr{P}(\vec{R}|(j,d,\alpha,\rho))$ and evaluated for d equal to $d_j^*$.

A confidence criterion for $\alpha_j^*$, $\rho_j^*$, and $d_j^*$ may be determined as discussed above responsive, optionally, to a value for $$\left[\frac{(R_1-ER_1(d^*,\rho^*,\alpha^*))^2}{\sigma_1^2}+\frac{(R_2-ER_2(d^*,\rho^*,\alpha^*))^2}{\sigma_2^2}+\frac{(R_3-ER_3(d^*,\rho^*,\alpha^*))^2}{\sigma_3^2}\right].$$

If the confidence criterion is not met by $\alpha_j^*$, $\rho_j^*$, and $d_j^*$, $d_j^*$ may be discarded as unreliable.

FIG. 2 schematically illustrates a method for experimentally calibrating TOF-3D camera 20 and determining reference function $RF(j,n,d\alpha_o,\rho_o,I_o)$ for each TOF exposure period $S_n$ on which response function $\overrightarrow{ER}(j,d,\alpha,\rho)$ may be based.

TOF-3D camera 20 is placed in a controlled environment 500 to image a calibration screen 502 at a plurality of different distances CS-$D_1$, CS-$D_2$, ... CS-$D_M$ from an optical center 121 of the TOF-3D camera. Calibration screen 502 is labeled by its respective distances CS-$D_1$, CS-$D_2$, ... CS-$D_M$ at which it is imaged and is schematically shown in solid lines at distance CS-$D_1$ and in dashed lines at distances CS-$D_2$, ... CS-$D_M$.

Calibration screen 502 has a known reflectivity $\rho_o$ and is exposed to a known intensity $\alpha_o$ of background light 504. Optionally, $\alpha_o$ is equal to zero. Optionally, calibration screen 502 is configured so that at each distance CS-$D_1$ ... CS-$D_M$ the calibration screen may be bent to a radius having magnitude substantially equal to the distance of the calibration screen from optical center 121. Optionally, calibration screen 502 is sufficiently large and is oriented at each distance CS-$_{D1}$ ... CS-$_{DM}$ so that each pixel $p_j$ (each pixel 23) in photosensor 22 images a region of the calibration screen.

For each distance CS-$D_1$ ... CS-$D_M$ from optical center 121 controller 24 controls light source 26 to illuminate calibration screen 502 with a train 40 of transmitted light pulses 41 having maximum intensity $I_o$ and pulse shape $P(t)$. For each transmitted light pulse 41, controller 24 controls shutter 25 to shutter ON TOF-3D camera 20, optionally for a TOF exposure period $S_1$ to register light reflected from the transmitted light pulses by the calibration screen. Reflected light from various regions of calibration screen at location CS-$D_1$ is schematically represented by trains 520 of reflected light pulses 521. The amounts of light registered by each pixel provide the values for reference function $RF(j,n,d,\alpha_o,\rho_o,I_o)$ for n=1. Optionally, the same procedure for determining $RF(j,n,d,\alpha_o,\rho_o,I_o)$ for n=1 is used for determining $RF(j,n,d,\alpha_o,\rho_o,I_o)$ for n equal to 2 to N. The determined values for $RF(j,n,d,\alpha_o,\rho_o,I_o)$ for $0<n\leq N$ are used to determine $\overrightarrow{ER}(j,d,\alpha,\rho)$.

Response function $\overrightarrow{ER}(j,d,\alpha,\rho)$ in accordance with an embodiment of the invention may be a discrete or a continuous function of d. $\overrightarrow{ER}(j,d,\alpha,\rho)$ may naturally be a discrete function of d because $RF(j,n,d,\alpha_o,\rho_o,I_o)$ is conveniently determined for discrete values of CS-$D_1$ ... CS-$_{DM}$. A continuous function $\overrightarrow{ER}(j,d,\alpha,\rho)$ may be determined by regression fitting an N dimensional curve to the discrete values of $\overrightarrow{ER}(j,d,\alpha,\rho)$. In an embodiment of the invention, to reduce complexity of processing, photosensor 22 may be partitioned into groups of pixels $\rho_j$, each group comprising a plurality of contiguous pixels. A common $\overrightarrow{ER}(j,d,\alpha,\rho)$ may be determined and used for all pixels $\rho_j$ in a same pixel group to determine distances to features imaged on the pixels.

In an embodiment of the invention, a normative response function $\overrightarrow{ER}_o(d,\alpha,\rho)$ for TOF-3D 20 is determined that may be used to determine distances to features imaged on different pixels $\rho_j$ of a plurality of pixels in the TOF-3D camera. Optionally the normative response function is response function determined for a central pixel $p_j$ of photosensor 22. A linear transform, "$\mathcal{T}$", is defined for the normative response function and each of the different pixels $\rho_j$ that transforms a given response function $\overrightarrow{ER}(j,d,\alpha,\rho)$ determined for pixel $p_j$ to $\overrightarrow{ER}_o(d,\alpha,\rho)$. In symbols $\mathcal{T}$ is a tensor that performs the transform:

$$\overrightarrow{ER}_o(d,\alpha,\rho)=\mathcal{T}\,\overrightarrow{ER}(j,d,\alpha,\rho). \quad (13)$$

To determine a distance $d_j^*$ to a feature imaged on a given pixel $p_j$ of the plurality of different pixels that registers amounts of light $\vec{R}$, (that is, provides a response vector $\vec{R}$ to incident light for TOF exposure periods $\vec{S}$) transform $\mathcal{T}$ is used to transform $\vec{R}$ to a response $\vec{R}_o$:

$$\vec{R}_o=\mathcal{T}\,\vec{R}. \quad (14)$$

A distance $d_o^*$ is determined that is a most probable distance expected for $\vec{R}_o$ and $\overrightarrow{ER}_o(d,\alpha,\rho)$ and used as distance $d_j^*$ for the given pixel $p_j$.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of determining distances to features in a scene, the method comprising:
    a. illuminating the scene with at least one light pulse;
    b. shuttering a camera ON for an exposure period for each of the at least one light pulse at a same known ON time as defined by a same delay relative to a time at which the light pulse is transmitted, to image light reflected by features in the scene on pixels of the camera;
    c. determining an amount of reflected light that a pixel in the camera registers for a feature imaged on the pixel during the exposure period;
    d. repeating a-c for each of a plurality of N different exposure periods distinguished one from the other by at least one or any combination of two or more of, a different ON time, a different OFF time, and a different exposure period sensitivity profile; and e. determining a distance to the feature responsive to the determined amounts of registered light for each of the N different exposure periods that maximizes a probability density function, which is a function of a probability density function for an amount of light that the pixel is expected to register as a function of distance of the feature for each of the different exposure periods.

2. The method according to claim 1 wherein the probability density function for an exposure period of the N different exposure periods is a function of distance of a feature imaged on the pixel, a reflectivity of the feature, and an intensity of background light illuminating features in the scene.

3. The method according to claim 2 wherein the probability density function for an exposure period of the N different exposure periods is a function of an amount of light from the at least one pulse that reaches the camera after undergoing more than one reflection in the scene.

4. The method according to claim 1 and comprising determining the probability density function for an exposure period of the N different exposure periods responsive to experimentally determining amounts of light registered by the pixel for a feature at a plurality of different known distances from the camera and having a known reflectivity.

5. The method according to claim 4 and comprising determining the probability density function for an exposure period of the N different exposure periods for exposure of the feature to a known amount of background light.

6. The method according to claim 1 wherein the probability density function for the pixel and an exposure period of the N exposure periods is determined responsive to a correlation between a profile of the exposure period and a pulse shape of the transmitted light pulses.

7. The method according to claim 1 and comprising using a same probability density function for an exposure period of the N different exposure periods for a plurality of contiguous pixels in the camera.

8. The method according to claim 1 and comprising determining a transform that transforms the probability density function for an exposure period of the N different exposure periods for a first pixel to a probability density function for an exposure period of the N different exposure periods for a second pixel, and using the determined probability density function for the second pixel to determine distance to a feature imaged on the first pixel.

9. The method according to claim 1 wherein the probability density function which is a function of a probability density function for each of the N exposure periods, is a multivariate probability density function that is a function of the distance and reflectivity of the feature, and intensity of background light for the scene.

10. The method according to claim 9 wherein determining distance for the feature comprises determining a reflectivity for the feature that maximizes the multivariate probability density function.

11. The method according to claim 9 wherein determining distance for the feature comprises determining an intensity of background light for the scene that maximizes the multivariate probability density function.

12. The method according to claim 9 wherein determining distance for the feature comprises integrating the multivariate probability density function with respect to the reflectivity and background light intensity.

13. The method according to claim 12 wherein integrating with respect to reflectivity and background light intensity assumes that reflectivity and background light intensity are uniform priors.

14. The method according to claim 2 and comprising:
determining a confidence parameter as a function of distance of the feature imaged on the pixel, the reflectivity of the feature, and the intensity of background light illuminating features in the scene;
determining a confidence interval for the confidence parameter; and
using the confidence parameter and confidence interval to provide a confidence level for the determined distance.

15. The method according to claim 1 wherein N is greater than three.

16. A time of flight (TOF) three dimensional (3D) camera that provides distances to features in a scene that the camera images, the camera comprising:
a light source controllable to transmit light pulses to illuminate the scene;
a photosensor having pixels that register light incident on the pixels;
an optical system that images light reflected by features in the scene from the transmitted light pulses on the pixels;
a shutter controllable to shutter ON and shutter OFF the camera to provide the camera with exposure periods; and
a controller that:
a. controls the light source to illuminate the scene with a plurality of flight pulses;
b. controls the shutter to shutter the camera ON for an exposure period for each of the at least one light pulse at a same known ON time as defined by a same delay relative to a time at which the light pulse is transmitted to image light reflected by features in the scene on pixels of the camera;
c. determines an amount of reflected light that a pixel in the camera registers for a feature imaged on the pixel during the exposure period;
d. performs a-c for each of a plurality of N different exposure periods distinguished one from the other by at least one, or any combination of two or more of, a different ON time, a different OFF time, and a different exposure period sensitivity profile; and
e. determines a distance to the feature responsive to the determined amounts of registered light for each of the N different exposure periods that maximizes a probability density function that is a function of a probability density function for an amount of light that the pixel is expected to register as a function of distance for each of the N different exposure periods.

17. The TOF-3D camera according to claim 16 wherein the function of the probability density function, for an exposure period of the N exposure periods is a function of distance of a feature imaged on the pixel, a reflectivity of the feature, and an intensity of background light illuminating features in the scene.

18. The TOF-3D camera according to claim 16 wherein the probability density function for an exposure period of the different exposure periods is a function of light that reaches the camera after undergoing more than one reflection in the scene.

* * * * *